United States Patent
Soeno et al.

[11] 3,909,763
[45] Sept. 30, 1975

[54] SELF-RESTORING CURRENT LIMITER

[75] Inventors: Ko Soeno; Hisashi Ando; Hiroshi Sakamoto, all of Hitachi, Japan

[73] Assignee: Hitachi, Ltd., Japan

[22] Filed: Feb. 12, 1974

[21] Appl. No.: 441,821

[30] Foreign Application Priority Data
Feb. 12, 1973  Japan.............................. 48-16599

[52] U.S. Cl. .................... 337/21; 337/114; 337/159
[51] Int. Cl.² ......................................... H01H 85/06
[58] Field of Search ............ 337/21, 114, 119, 123, 337/158, 159, 331, 401

[56] References Cited
UNITED STATES PATENTS
3,599,137  8/1971  Ito et al. ......................... 337/159 X
3,699,489  10/1972  Imajyo ............................ 337/121 X
3,747,040  7/1973  Inoue et al. ........................ 337/119

Primary Examiner—G. Harris
Attorney, Agent, or Firm—Craig & Antonelli

[57] ABSTRACT

A self-restoring current limiter is provided for protecting an electrical circuit from an excessive current which may be produced due to over-loaded conditions or short-circuited states. A liquid or partially molten material with a low electric resistance in normal states of conduction exhibits a high electric resistance by producing metal vapor under abnormal conditions. The current limiting material comprises indium as a base metal to which a component is added for increasing the vapor pressure at high temperatures and maintaining the liquid or half-molten state of the material at room temperature.

10 Claims, 5 Drawing Figures

SELF-RESTORING CURRENT LIMITER

BACKGROUND OF THE INVENTION

1. Field Of The Invention

This invention relates to a self-restoring current limiter for protecting an electrical circuit from an excessive current which may be generated by overloaded conditions or short-circuited states.

2. Description Of The Prior Art

An electrical circuit, especially receiving equipment, has a series-connected current limiter and circuit breaker respectively for limiting and breaking current for protecting the electrical circuit from an excess current at the time of an accident. In view of the fact that it takes several tens of milliseconds before the circuit is completely broken by the breaker at such a time, the protection of the circuit requires the current flow to be limited before the maximum current value associated with the accident is reached.

A current limiting fuse is in general use as a current limiter doubling as a circuit breaker. This current limiting fuse, in spite of its high ability to break an excessive current, is accompanied by troublesome maintenance work such as a replacement thereof after breaking.

For this reason, self-restoring current limiters comprised of current limiting metal material have been developed. The self-restoring current limiter has a current limiting material enclosed therein and electrodes arranged across the current limiting material, so that when the current limiting material is overheated by an excessive current flowing between the electrodes, the resistance of the current limiting material is sharply increased thereby limiting the current flow. When the cause of the accident is removed and the original value of the current is restored, on the other hand, the electric resistance of the current limiting material returns to its normal value.

The three conditions required of the above-mentioned self-restoring current limiter are:

1. that there is only a small resistance when a normal current is flowing,
2. that the electric resistance of the current limiting material is sharply increased when it is overheated by an excessive current flowing therethrough and
3. that the resistance of the current limiting material returns to its original value when the excessive current is eliminated or when the power is broken by the operation of the circuit breaker.

The current limiting materials for the self-restoring current limiters well known and widely used include sodium, potassium and alkaline metals and their alloys, lead, tin and mercury.

When the current limiting material of lead or tin is melted by the heat due to an excessive current, its specific resistivity becomes approximately twice as high. Thus the current flow is limited by taking advantage of this sharp increase in specific resistivity. In a current limiting material using an alkaline metal or mercury which is relatively low in boiling point, advantage is taken of the current limiting function due to arcs generated in the gaseous metal and the sharp increase in specific resistivity at the time of its evaporation.

Lead and tin have no sufficient current limiting function due to the fact that their specific resistivity after the temperature increase due to an excessive current is only twice its original level. On the other hand, an alkaline metal, in spite of its sufficiently high current limiting ability developed by the resistance increase resulting from its evaporation, is so active that it is easily oxidized and changes in quality in the air. Therefore, the work for manufacturing current limiters with such materials must be conducted in a completely inactive environment, which in turn requires a complicated arrangement for assuring air tightness of the current limiter.

It is a well known fact that mercury has a specific resistivity of about 100 $\mu\Omega$cm at room temperature which is much higher than that of other conductive materials, resulting in a comparatively high electric resistance to a normal current. This makes it necessary to reduce its electric resistance by enlarging the section of the current limiting material, thus leading to disadvantage of bulkiness of the current limiter. Further, since the vapor pressure of mercury abnormally increases when it is heated by an exccessive current, a complex pressure resistance construction as well as the large size of the current limiter is required, thus making it difficult to manufacture a self-restoring current limiter with a large breaking current.

SUMMARY OF THE INVENTION

Accordingly, it is an object of the invention to provide a self-restoring current limiter comprising a novel current limiting material.

An another object of the invention is to provide a current limiting material whose electric resistance at room temperature or thereabouts and vapor pressure at high temperatures can be selected at will within a certain range.

A further object of the invention is to provide a self-restoring current limiter simple in construction and capable of being easily manufactured.

To achieve the above-described objects, the current limiting material according to the invention comprises indium as a base metal to which mercury, mercury-cadmium, mercury-zinc, mercury-zinc-cadmium, gallium-cadmium, gallium-zinc or gallium-cadmium-zinc combination is added.

One of the characteristics required of the current limiter is that its electric resistance is low at room temperature or thereabouts. Specifically, its specific resistivity should be 80 $\mu\Omega$.cm or less which is not higher than 80 % of the specific resistivity of pure mercury or preferably 50 $\mu\Omega$.cm or less. Another requirement is that once the current limiting action takes place, the original desirable physical shape is restored when the normal conductive state is regained by the removal of the abnormal conditions. To attain such a feature, the current limiting material is required to have a physical property capable of being easily deformed at room temperature or thereabouts and be capable of being refilled in the housing containing it by a small external force, thus simplifying its construction. The half-molten state as an alternative to the liquid form mentioned above as a requirement of the current limiting material at room temperature is defined, for the purpose of the present specification, as the state of a current limiting material which melts at approximately 17°C or below.

When the current limiting material of metal contained in an electrically insulative housing is heated by an excessive current flowing therein through a pair of electrodes at the ends thereof, the specific resistivity of the current limiting material becomes several times higher than its original value as it is transformed from a solid to a liquid state. Even though the specific resistivity of a liquefied metal increases further with the temperature increase, the greatest increase in resistance takes place at the point where it is transformed from liquid to vapor. A vapor phase of the current limiting material is formed when its vapor pressure exceeds the external pressure. This vapor phase of the material is so great in resistance as to interrupt the excessive current. In that case, the excessive current is attenuated within a reasonable time period by an arc formed in the generated metal vapor, and the current is thus safely broken. In other words, the current limiter is advantageously designed by selecting a current limiting material having an appropriate vapor pressure at predetermined temperatures. According to the present invention, there is provided a current limiting material whose vapor pressure is selected at 760 mmHg in the temperature range from about 350° to 1500°C by appropriately selecting and controlling the component and the amount to be added to the base metal of indium.

DESCRIPTION OF THE PREFERRED EMBODIMENTS

The current limiting material according to the present invention comprises indium with an electric resistivity as low as 10 $\mu\Omega$cm at room temperature to which at least one element selected from among mercury, gallium, zinc and cadmium is added in such a manner that the resulting compound is in a liquid or half-molten state, filling in the current limiter, and has a resistivity of 60 $\mu\Omega$cm of less which is lower than 80 % of the resistivity of pure mercury.

When 35 % or more by weight of mercury is added to indium, the result is a solid phase of $HgIn_{11}$ depending on the amount of mercury actually added, even though the most part of the compound is in liquid form. The greater the amount of mercury added, the more difficult it is to form a solid phase, but a higher resistivity results as a matter of course in view of the fact that the resistivity of mercury is 98 $\mu\Omega$cm at 20°C or about 10 times that of the indium. Desirably, the resistivity of the current limiter is 50 to 60 $\mu\Omega$cm or less, and therefore the amount of mercury to be added to an indium-mercury compound is limited to 60 % by weight or less.

Figure 1:
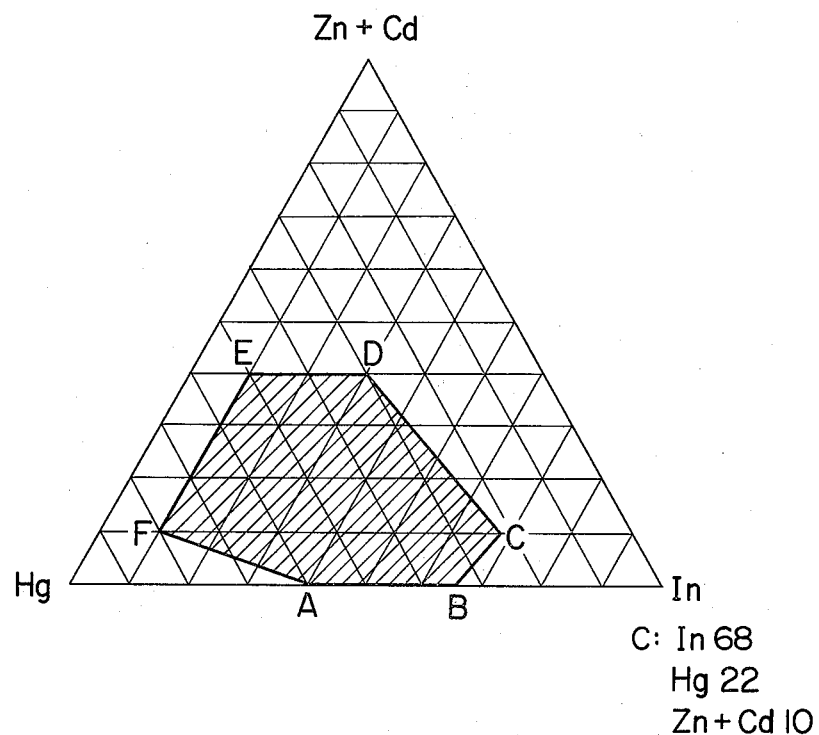
FIG. 1 is a diagram showing the distribution of relative amounts of components of the ternary system including In, Hg and Zn + Cd, in whichc the composition range of a current limiting material according to the present invention is indicated by the shadowed portion defined by A, B, C, D, E and F.

In the case where zinc and/or cadmium are added to the indium-mercury compound, the allowable amount of indium is increased to 10 to 68 % by weight. In other words, when mercury is added, the effective range of the composition of the current limiting material according to the present invention is represented by the area defined by A, B, C, D, E and F in the diagram of FIG. 1 showing the distribution of relative amounts of components including indium, mercury and zinc + cadmium. In FIG. 1, point A represents 40In - 60 Hg, point B 65In - 35 Hg, point C 68In - 22Hg - 10(Zn + Cd), point D 30In - 30Hg-40(Zn + Cd), point E 10In - 50Hg - 40(Zn+Cd), and point F 10In-80Hg-10(Cd+Zn). Indium and gallium fuse with each other in a relatively wide range of their concentrations, a mixture of indium and gallium containing gallium of 83.5 weight per cent can form a eutectic at 15.7°C.

Figure 2:
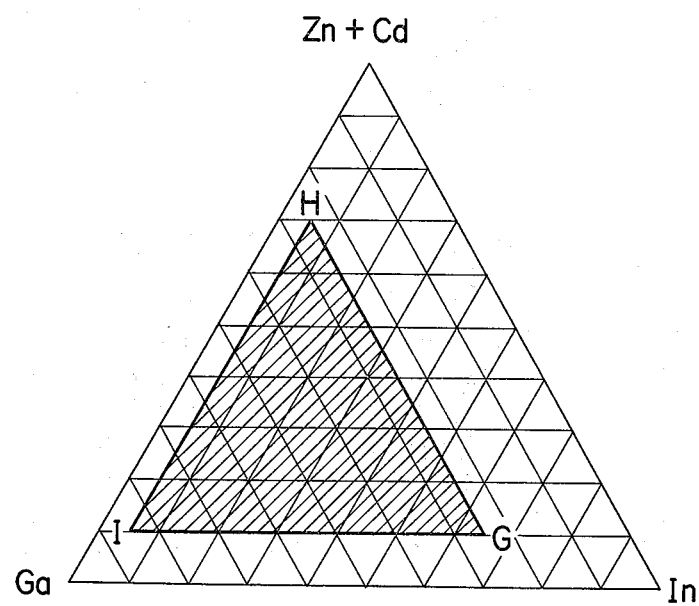
FIG. 2 is a similar diagram showing the distribution of relative amounts of components of the ternary system including In, Ga and Zn + Cd, in which the composition range of another current limiting material according to the invention is represented by the shadowed portion surrounded by G, H and I.

As will be recalled, the effective operation of the current limiter requires that at least part of the current limiting material is evaporated under an appropriate vapor pressure at an excessive current. Indium and gallium are, however, so low in vapor pressure that they must be heated up to 2000°C or thereabouts if the vapor pressure of, say, 760 mmHg is to be achieved. For this reason, the vapor pressure is increased by adding zinc, cadmium or their mixture, thus providing the characteristic required of a current limiting material. In FIG. 2, showing the distribution of relative amounts of components of a current limiting material including In, Ga and Zn + Cd, the composition of another current limiting material according to the invention is represented by the shadowed portion surrounded by points G, H and I respectively representing 65In-25Ga-10(Zn+Cd), 5In-25Ga-70(Zn+Cd), and 5In-85Ga-10(Zn+Cd). In other words, the current limiting material, as far as its composition is included in the shadowed portion, is in liquid form on half-molten state at room temperature and has 50 $\mu\Omega$cm or less in resistivity. Further, the current limiting material in that range of composition has a vapor pressure of 760 mmHg at 1500°C or below, thus meeting the requirement of a current limitier. Incidentally, in spite of the fact that the composition associated with FIG. 2 includes Zn+Cd, it may be replaced with equal effect by a single element of zinc or cadmium in the applications of the invention.

Figure 3:
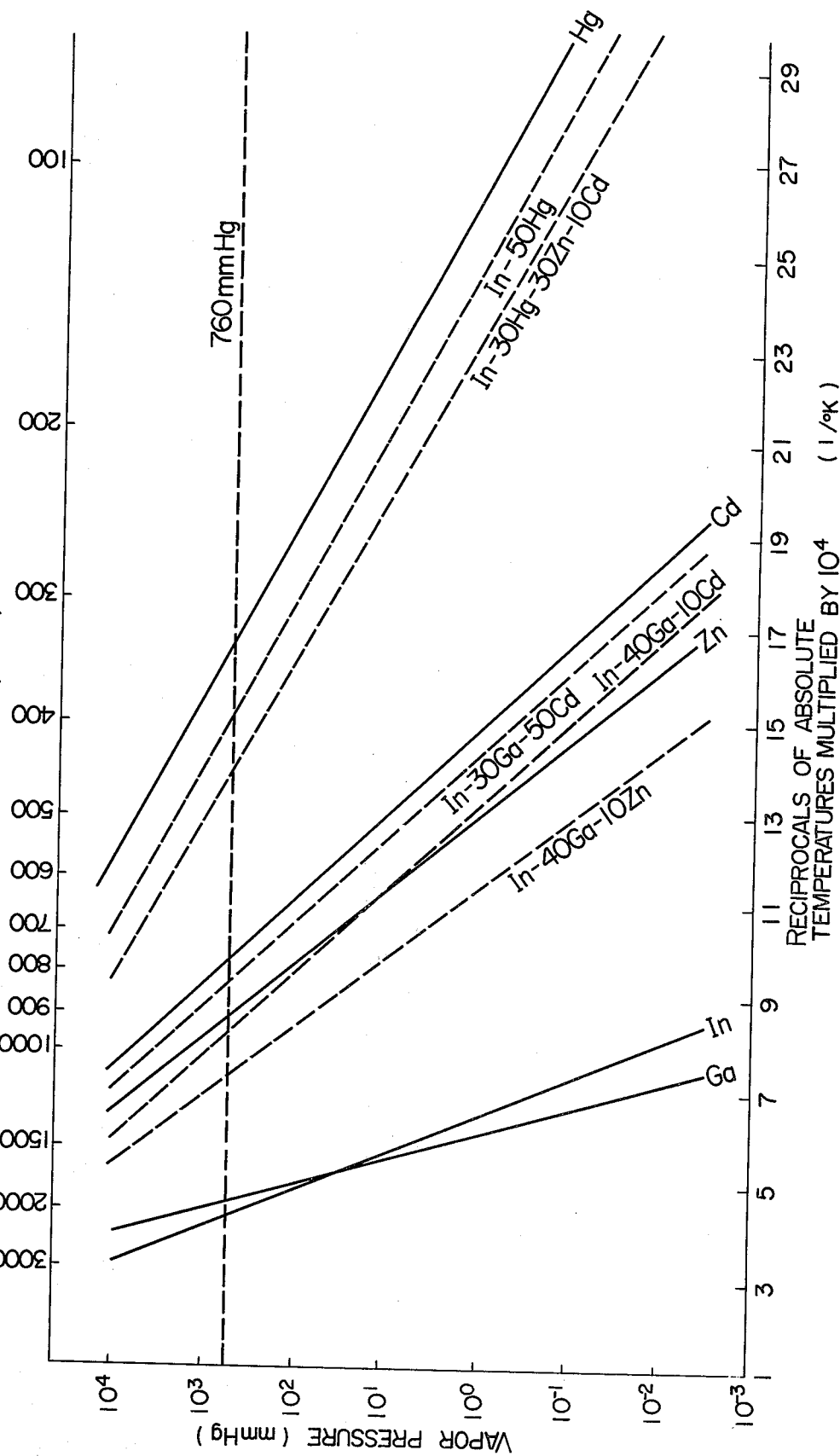
FIG. 3 is a graph showing the temperatures of the respective metals as related to the vapor pressures thereof.

Vapor pressure lines of indium, mercury, gallium, zinc and cadmium and actual measurements of the vapor pressure of the representative compounds according to the invention are shown in FIG. 3. The selection of the vapor pressure characteristic of a compound for a current limiting material depends on the capacity, construction, field of application and the like of the current limiter involved, and the wide range allowable for selection is a great advantage in designing the current limiter.

Figure 4:
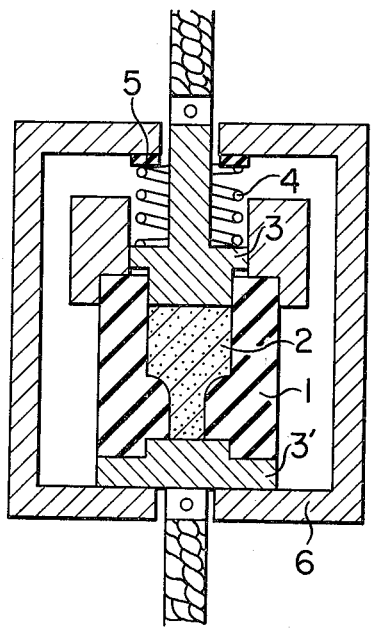
FIG. 4 is a diagram showing an embodiment of the present invention comprising an electrically insulative housing 1, a current limiting material 2 filled in the insulative housing 1, upper and lower electrodes 3 and 3', a spring 4 for pressing the electrode 3 against the current limiting material 2, an insulative bush 5 and a fixing frame 6 with the insulative bush 5 being interposed between the fixing frame 6 and the spring 4 for electrical insulation.

Referring to an embodiment of the present invention illustrated in FIG. 4, the current limiter according to the present invention comprises fundamentally a housing 1 containing a current limiting material 2, a pair of electrodes 3 and 3' which together with the current limiting the material form a current path, and a structure such that at least part of the current limiting material 2 making up the current path is capable of being evaporated when the current limiting material is heated to a high temperature. Since the current limiting action takes place in the most narrow portion of the limiting material which forms a part of the current path, the current limiting material after performing the current limiting operation is restored to the state before the current limiting operation in this narrow portion. For the reasons mentioned above, the current limiting material is required to be deformable, and thus the current limiting material in a half-molten state or in a liquid phase is advantageously employed. In addition thereto, the current limiting material is required to have a small resistivity to reduce the size of the current limiter. A resistivity not higher than 80 % of that of mercury, preferably less than 50 $\mu\Omega cm$ at room temperature, is needed.

The materials of the structural elements of the current limiter arranged in contact with the current limiting material must not react with the current limiting material. The electrically insulative housing, for example, may be alumina, beryllia, or magnesia. The remaining structural elements may consist of or be lined with such materials as iron, nickel, chromium, cobalt, platinum or the like.

In order to allow a part of the current limiting material to be evaporated, either the housing containing the current limiting material is elastic, or an inactive gas under high pressure is enclosed in a part of the housing, or a piston is provided for absorbing the expansion of the volume of the current limiting material.

Figure 5:
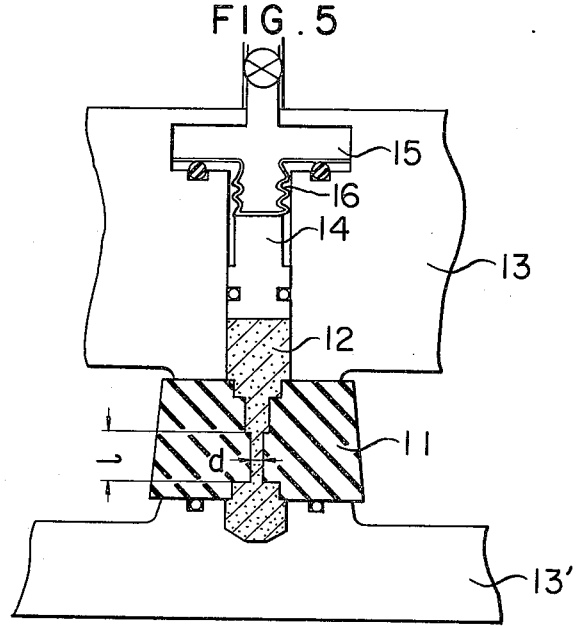
FIG. 5 is a diagram showing a current limiter according to the invention wherein the current limiting characteristics are measured for testing the ability of the limiter, the current limiter comprising a ceramic cylinder 11 with a through hole provided at the center thereof and filled with a current limiting material, wherein pressure derived from a gas chamber enclosing a high pressure gas is applied to the current limiting material through a piston 14, while at the same time an excessive current intentionally flows between the electrodes 13 and 13' for the measurement.

An embodiment of the invention will be explained below. A predetermined amount of current limiting material, after being weighed, is well mixed and kneaded in a ceramic crucible. If it is difficult to make its composition uniform, it should preferably be stirred well in a water bath while being heated thereby to produce a current limiting material of a uniform composition. The current limiting ability of this current limiting material is tested by the testing equipment as shown in FIG. 5. Referring to FIG. 5, a current limiting material 12 is filled in a through hole with the diameter $d$ of 2 mm and the length $l$ of 8 mm provided within a highly insulative ceramic cylinder 11 of alumina, so that the current limiting material 12 is subjected to a predetermined pressure applied by the piston 14 provided above the current limiting material 12. The pressure is maintained by a high pressure gas contained in the chamber 15 and the bellows 16, one end of the bellows being joined with the chamber and the other end joined with the piston. Reference numerals 13 and 13' show upper and lower electrodes of iron. The current limiter of this construction is inserted in a circuit with the circuit resistance of 53 m$\Omega$ and the voltage of 460 volts is applied thereto thereby to make a short-circuiting current of 8.7 KA flow therethrough. Under this condition, variations in voltage and current are observed on an oscillograph thereby measuring the maximum values of resistancce at the time of the current limiting action and after. Various compositions of the current limiting material according to the present invention and resistance values thereof at the time of and after current limiting operations are shown in Table 1. All of the Samples Nos. 1 to 21 are current limiting materials in liquid form or half-molten state according to the invention, reference Nos. 1 to 5 showing liquid or solid current limiting materials not included in the scope of the invention.

Ten current limiting tests have been conducted on Samples Nos. 1 to 21, and the resistance values shown in the table are average ones obtained from the 1st to 10th tests. For comparison, reference No. 1, representing pure mercury, was subjected to current limiting tests 10 times, while the figures of reference No. 2 through reference No. 5, representing materials outside the scope of the present invention, show the results of only the first test because the impossibility of restoring the original state after the first test did not allow the inventors to proceed with the subsequent tests.

All of the current limiting materials according to the present invention have superior current limiting characteristics, since their resistivities not higher than 80 % of that mercury are increased at the time of current limiting action up to a level more than 200 times higher than that, Table 1

| Sample No. | Composition of current limiting material (% by weight) | | | | | Resistance in m$\Omega$ during current limiting action | Resistance in m$\Omega$ after current limiting action |
|---|---|---|---|---|---|---|---|
| | Hg | Ga | Zn | Cd | In | | |
| 1 | 30 | — | — | — | all of the rest | 322 | 0.8 |
| 2 | 30 | — | 5 | 5 | " | 343 | 0.9 |
| 3 | 30 | — | 20 | 10 | " | 381 | 0.9 |
| 4 | 40 | — | — | — | " | 417 | 1.3 |
| 5 | 40 | — | 10 | 30 | " | 481 | 1.2 |
| 6 | 50 | — | — | 10 | " | 497 | 1.6 |
| 7 | 50 | — | 20 | 20 | " | 515 | 1.2 |
| 8 | 55 | — | — | — | " | 452 | 1.8 |
| 9 | 60 | — | 15 | 15 | " | 598 | 2.3 |
| 10 | 70 | — | 10 | — | " | 653 | 2.8 |
| 11 | 80 | — | — | 10 | " | 680 | 2.9 |
| 12 | — | 30 | 5 | 5 | " | 214 | 0.8 |
| 13 | — | 30 | 20 | 10 | " | 220 | 0.9 |
| 14 | — | 30 | 10 | 30 | " | 347 | 0.8 |
| 15 | — | 30 | 20 | 40 | " | 413 | 0.8 |
| 16 | — | 40 | 20 | — | " | 283 | 0.8 |
| 17 | — | 40 | 20 | 20 | " | 450 | 0.8 |
| 18 | — | 50 | — | 20 | " | 272 | 0.9 |
| 19 | — | 60 | 15 | 15 | " | 311 | 0.8 |
| 20 | — | 70 | — | 10 | " | 188 | 0.7 |
| 21 | — | 70 | 10 | 10 | " | 214 | 0.8 |
| Reference No. | | | | | | | |
| 1 | 100 | — | — | — | — | 700 | 4.0 |
| 2 | 10 | — | — | — | All of the rest | 80 | $\infty$ |
| 3 | 20 | — | — | — | " | 135 | $\infty$ |
| 4 | — | 20 | 15 | 15 | " | (225)* | (0.9)* |
| 5 | — | 85 | — | — | " | 51 | $\infty$ |

*Limiting action incomplete

Further, the original condition is restored within a short time after the current limiting action, and the fact that no excessive pressure over that required is generated at the time of current limiting action makes possible a simplified construction of the housing, pressure-applying mechanism and enclosed sliding portions.

We claim:

1. A self-restoring current limiter comprising a current limiting material, means having a chamber for accommodating said current limiting material, at least a pair of electrodes electrically connected with said current limiting material, and means for absorbing the variations in volume of said current limiting material; said current limiting material including an indium alloy material; part of said alloy being in liquid form and having a resistivity of not more than 50 $\mu\Omega$cm at approximately room temperature and a vapor pressure of not less than 760 mmHg at 1500°C.

2. A self-restoring current limiter according to claim 1, in which said current limiting material comprises an alloy comprises of indium and at least one of the elements including mercury, gallium, zinc and cadmium.

3. A self-restoring current limiter according to claim 1, in which said current limiting material is one selected from the group consisting of In-Hg, In-Hg-Zn, In-Hg-Cd, In-Hg-Zn-Cd, In-Ga-Zn, In-Ga-Cd and In-Ga-Zn-Cd.

4. A self-restoring current limiter according to claim 1, in which said current limiting material comprises indium and 35 to 60% by weight of mercury.

5. A self-restoring current limiter according to claim 1, in which said current limiting material comprises indium, mercury and zinc in such a composition range in weight ratio as represented by the area surrounded by points A, B, C, D, E and F on the triangle diagram shown in FIG. 1.

6. A self-restoring current limiter according to claim 1, in which said current limiting material comprises indium, mercury and cadmium in such a composition range in weight ratio as represented by the area surrounded by points A, B, C, D, E and F on the triangle diagram shown in FIG. 1.

7. A self-restoring current limiter according to claim 1, in which said current limiting material comprises indium, mercury, zinc and cadmium in such a composition range in weight ratio as represented by the area surrounded by points A, B, C, D, E and F on the triangle diagram shown in FIG. 1, zinc and cadmium constituting one component of said current limiting material.

8. A self-restoring current limiter according to claim 1, in which said current limiting material comprises indium, gallium and zinc in such a composition range in weight ratio as represented by the area surrounded by points G, H and I on the triangle diagram shown in FIG. 2.

9. A self-restoring current limiter according to claim 1, in which said current limiting material comprises indium, gallium and cadmium in such a composition range in weight ratio as represented by the area surrounded by points G, H and I on the triangle diagram shown in FIG. 2.

10. A self-restoring current limiter according to claim 1, in which said current limiting material comprises indium, gallium, zinc and cadmium is such a composition range in weight ratio as represented by the area surrounded by points G, H and I on the triangle diagram shown in FIG. 2, zinc and cadmium constituting one component of said current limiting material.

* * * * *